United States Patent [19]
Frantz

[11] 3,877,730
[45] Apr. 15, 1975

[54] METHOD OF REPAIRING A FLANGE FACE OF A CLAMPED-FLANGE SEALING-RING TYPE PIPE COUPLING

[75] Inventor: Charles E. Frantz, Richland, Wash.

[73] Assignee: The United States of America as represented by the United States Atomic Energy Commission, Washington, D.C.

[22] Filed: Feb. 12, 1974

[21] Appl. No.: 441,772

[52] U.S. Cl. .................. 285/15; 29/401 R; 277/9; 285/55; 285/286; 285/334.2; 285/367
[51] Int. Cl. ............................................. F16l 55/18
[58] Field of Search ......... 285/15, 16, 55, 324, 378, 285/334.2, 286, 336, 367; 277/9, 171; 29/401 R, 401.4, 401.5, 470, 474.3

[56] References Cited
UNITED STATES PATENTS

| | | | |
|---|---|---|---|
| 1,301,245 | 4/1919 | Fox | 285/329 |
| 2,310,944 | 2/1943 | Douglass | 285/324 X |
| 2,766,999 | 10/1956 | Wotts et al. | 285/334.2 |
| 3,367,682 | 2/1968 | Meriono | 285/106 |
| 3,425,718 | 2/1969 | Shaw | 285/286 X |
| 3,628,812 | 12/1971 | Lorraide et al. | 285/334.2 |

*Primary Examiner*—Dave W. Arola
*Attorney, Agent, or Firm*—John A. Horan; Arthur A. Churm; Robert J. Fisher

[57] ABSTRACT

This invention relates to a method for repairing a leaking joint between two pipes coupled with a clamped-flange sealing-ring type pipe coupling and the improved pipe coupling which results therefrom. A flange liner is mounted over the surface of a corroded flange face and welded thereto about the periphery thereof. The sealing ring is inserted between the surface of the flange liner and the surface of the flange on the second pipe. The two flanges are then drawn tightly against the sealing ring, effecting a leaktight seal at the joint.

4 Claims, 1 Drawing Figure

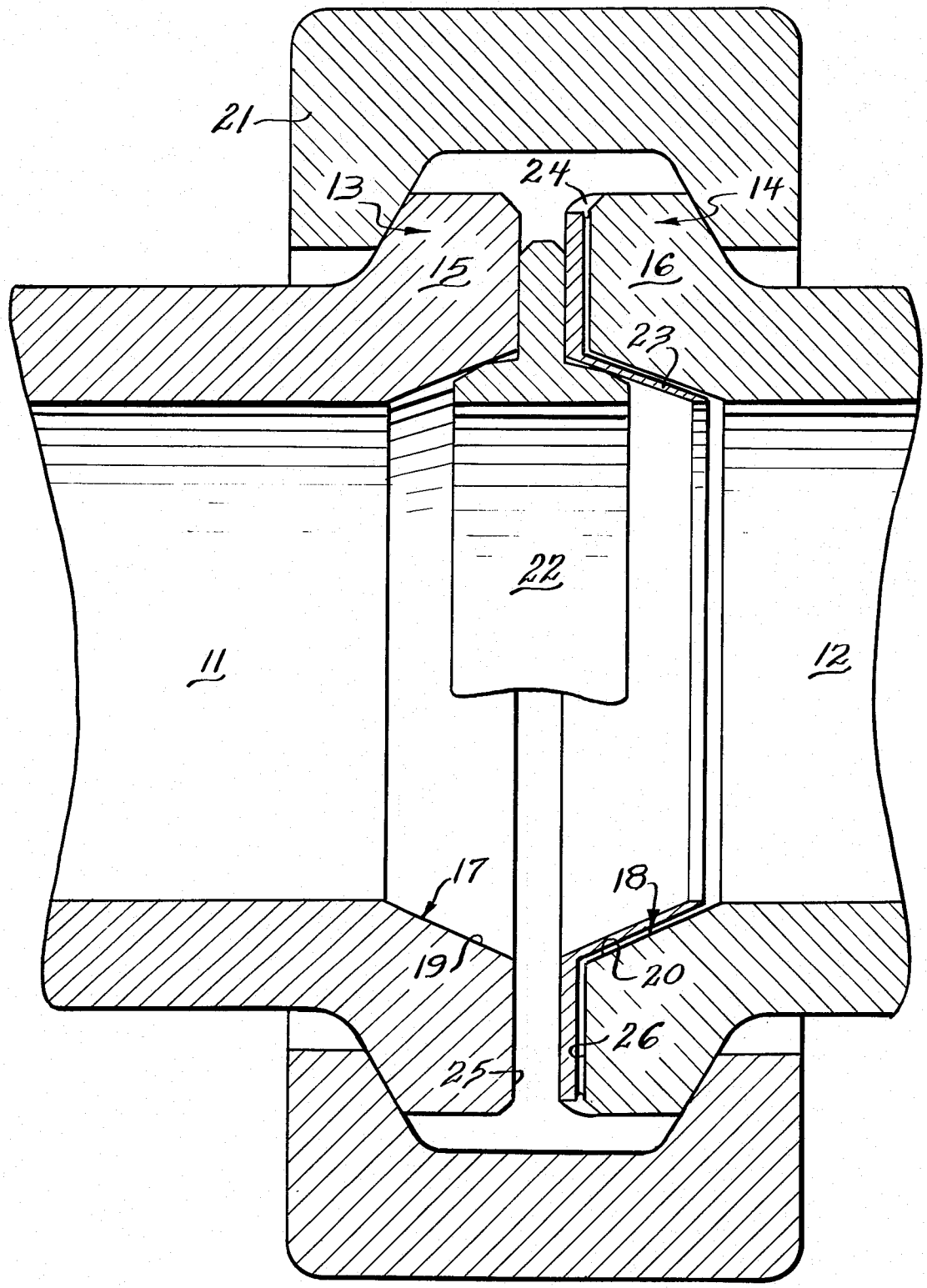

METHOD OF REPAIRING A FLANGE FACE OF A CLAMPED-FLANGE SEALING-RING TYPE PIPE COUPLING

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Of the many various types of pipe couplings, one which is commonly in use is a clamped-flange sealing-ring type pipe coupling. In such a pipe coupling, flanges are machined on the ends of each of the pipes which are to be coupled, and a sealing ring gives an interference fit against sealing surfaces on the flanges of the two pipes. The clamp fits over the two flanges and is tightened to draw the two flanges together against the sealing ring, thereby effecting the seal. Examples of this type of pipe coupling are shown in U.S. Pat. Nos. 3,367,682 issued to A. P. Meriano, and particularly U.S. Pat. No. 3,404,902 issued to R. E. Latham et al., and U.S. Pat. No. 3,216,746 issued to J. D. Watts.

In use, these flanged joints develop leaks because of corrosion pitting in the sealing area, particularly corrosion of the flange face of the pipe coupling. When the flange face of the pipe itself corrodes, mere replacement of the sealing ring will not effect a leaktight seal but rather a remachining of the flange face itself is necessary. In situ remachining of the flange sealing surface is very difficult because of the high precision required. In addition, in some applications such as in piping within a nuclear reactor installation, a remachining operation in situ is extremely costly in personnel radiation exposure. Therefore, it is often necessary to remove the entire section of pipe and transfer the pipe to a machine shop for remachining of the flange sealing surface.

Therefore, it is an object of the present invention to provide a method for repairing a leaking joint between two pipes coupled with a clamped-flange sealing-ring type pipe coupling.

It is a particular object of the present invention to provide a method for repairing such a pipe coupling wherein the leak is caused by corrosion of the flange face of one of said pipes.

It is another object of the present invention to provide an improved pipe coupling by repairing a clamped-flange sealing-ring type pipe coupling in accordance with the present method.

Another object of the present invention is to provide a method for repairing a clamped-flange sealing-ring type pipe coupling in situ.

SUMMARY OF THE INVENTION

In accordance with the method of the present invention, a flange liner is mounted over the surface of the corroded flange face of a pipe which is joined to a second pipe with a clamped-flange sealing-ring type pipe coupling. The flange liner is welded to the flange about the entire periphery. The sealing ring is inserted between the surface of the flange liner and the surface of the flange of the second pipe, and a leaktight seal is effected at the joint of the two pipes by drawing the two flanges tightly against the sealing ring with a clamp.

BRIEF DESCRIPTION OF THE DRAWING

Other objects and advantages of the present invention will become apparent upon reading the description and with reference to the drawing which is a sectional view of an improved pipe coupling resulting from repair of a leaking pipe coupling in accordance with the present method.

DESCRIPTION OF THE INVENTION

The method for repairing the leaking joint and the improved pipe coupling of the present invention can best be understood by referring to the drawing which shows the coupling between two pipes 11 and 12. While the invention will be described in connection with a particular embodiment, it should be understood that it is not intended to limit the invention to that one embodiment. On the contrary, it is intended to cover other embodiments, modifications and equivalents as are included within the spirit and scope of the invention as defined by the appended claims, and reference is made to the particular embodiment only to facilitate description of the invention.

Referring again to the drawing, it can be seen that pipe 11 has a flange indicated at 13 located at the end thereof and, similarly, pipe 12 has a flange 14 at its end. In the particular embodiment shown in the drawing, hub 15 of flange 13 and hub 16 of flange 14 have therein conical seats indicated at 17 and 18, respectively. The flange face 25 of flange 13 includes a portion which is hub sealing surface 19 on hub 15 and flange face 26 of flange 14 includes a portion which is hub sealing surface 20 on hub 16. In normal operation, a seal is effected at the joint between the two pipes 11 and 12 by a two-piece clamp 21 which engages flanges 13 and 14, drawing them together such that a seal is effected between the hub sealing surfaces, such as sealing surface 19, and a sealing ring 22 which is held in the conical seat, such as 17, of the hub 15 of the flange 13.

In accordance with the present invention, a leaking joint due to corrosion of a flange face such as flange face 26 of flange 14 and particularly a corroded sealing surface such as sealing surface 20 on the hub 16 is repaired and an improved pipecoupling is formed by mounting a flange liner 23 over the corroded flange face 26 including hub sealing surface 20 and welding flange liner 23 to the flange 16 about the periphery thereof, as is indicated by the weld 24. Clamp 21 then draws flanges 13 and 14 together on sealing ring 22 such that a leaktight seal is effected between sealing ring 22 and the sealing surface 19 and between sealing ring 22 and the surface of flange liner 23.

Although the invention has been described with respect to the mounting of a flange liner over the surface of a corroded flange face on one pipe, it should be understood that the invention is equally applicable where the flange faces of both of the joined pipes have corroded. In such an instance a flange liner would be mounted over the surface of the flange face of each pipe with the resulting seal being effected between the sealing ring and each of the two flange liners.

While the flange liner to some extent will be forced to conform to the contour of the flange face, it is preferred that the flange liner be preformed to a contour which closely duplicates the flange face prior to mounting the liner over the corroded flange.

If the hub liner does not exactly duplicate the surface of the flange face, the liner may not fit such that the entire sealing surface of the liner is backed up by the solid hub conical surface. However, the lack of an exact fit is not a problem. The introduction of any fluid between the old hub sealing surface and the flange liner will exert a fluid pressure between the hub surface and the liner. This pressure will force the liner against the sealing ring, further enhancing the effected seal. In this case, the liner will tend to act as a membrane, being forced against the sealing ring by unequal area hydraulic pressures enveloping the sealing region of the sealing ring. There is a greater area and therefore force pushing the liner against the seal ring than there is tending to separate the liner from the seal ring. This results in less exacting precision requirements in the liner fit in the hub. However, as long as the liner will make a primary seal at low pressure, a seal will be effected irregardless of the lack of fit in the cone of the hub. The pressure seal actuation also makes the liner installation independent of temperature and pressure fluctuation and there is no tendency for the seal to develop leaks because of inching movements caused by temperature and pressure fluctuations.

Repair of a leaking pipe joint in accordance with the present method offers several distinct advantages. Since there is no machining of the surfaces involved and only a single weld about the periphery of the flange is required, the flange liner and flange can be welded in situ with very little difficulty. This provides a distinct advantage over the previous necessity of removing the section of pipe and transferring it to a machine shop for machining and reconditioning of the flange surface. The welding operation also can be performed with an automatic welder which offers the further advantage that the operation can be performed without the necessity of exposing personnel to radiation, should the leaking joint be located in an area which is subject to irradiation. The welding can be accomplished by various welding techniques, inert gas fusion welding being one which has been found to be particularly useful.

The embodiments of the invention in which an exclusive property or privilege is claimed are defined as follows:

1. A method of repairing a leaking joint between two pipes coupled with a clamped-flange sealing-ring type pipe coupling wherein said leak is caused by corrosion of the flange face of one said pipe comprising: mounting a flange liner over the surface of the corroded flange face; welding said flange liner to said flange about the periphery thereof; inserting a sealing-ring between the surface of said flange liner and the surface of the flange of the second pipe; and drawing said two flanges tightly against said sealing-ring; whereby a leak-tight seal is effected at the joint of said pipes.

2. The method in accordance with claim 1 further comprising: preforming said flange liner to a contour which duplicates said flange face prior to mounting said flange liner over said corroded flange.

3. The method of claim 2 wherein said flange liner and flange are welded in situ with an automatic welder.

4. In a clamped-flange sealing-ring type pipe coupling wherein a sealing-ring is held in a conical seat in a hub of a flange on the end of each of the two pipes to be coupled, said sealing-ring engages a sealing-surface on said hub, and a seal is effected by drawing together with a clamp the flanges of the two pipes which are to be coupled, and wherein the sealing-surface on the hub of a flange has corroded, the improvement therein comprising: a flange liner mounted over the surface of said hub of said flange and lying between said corroded sealing-surface on said hub and said sealing-ring, said flange liner being preformed to a contour which duplicates the surface of the hub of said flange and sealingly joined to said flange by a weld about the periphery thereof.

* * * * *